(12) United States Patent
Wolf et al.

(10) Patent No.: US 8,495,045 B2
(45) Date of Patent: Jul. 23, 2013

(54) METHOD AND APPARATUS FOR CREATING AN ACTIVITY RECORD IN A BUSINESS MANAGEMENT SYSTEM FROM AN EMAIL MESSAGE

(75) Inventors: Werner G. Wolf, Wiesloch (DE); David L. Sacks, Bedford, NH (US)

(73) Assignee: SAP AG, Walldorf (DE)

( * ) Notice: Subject to any disclaimer, the term of this patent is extended or adjusted under 35 U.S.C. 154(b) by 1892 days.

(21) Appl. No.: 10/909,380

(22) Filed: Aug. 3, 2004

(65) Prior Publication Data

US 2006/0015533 A1    Jan. 19, 2006

Related U.S. Application Data

(60) Provisional application No. 60/588,392, filed on Jul. 16, 2004, provisional application No. 60/588,391, filed on Jul. 16, 2004.

(51) Int. Cl.
*G06F 17/30* (2006.01)

(52) U.S. Cl.
CPC .... *G06F 17/30595* (2013.01); *G06F 17/30286* (2013.01); *G06F 17/30569* (2013.01); *Y10S 707/922* (2013.01); *Y10S 707/944* (2013.01)
USPC ............................. 707/705; 707/922; 707/944

(58) Field of Classification Search
CPC .......... G06F 17/30595; G06F 17/30286; G06F 17/30569
USPC ............................... 709/206; 707/6, 922, 944
See application file for complete search history.

(56) References Cited

U.S. PATENT DOCUMENTS

| | | | | |
|---|---|---|---|---|
| 5,923,848 A * | 7/1999 | Goodhand et al. | ............ | 709/219 |
| 6,134,582 A * | 10/2000 | Kennedy | ....................... | 709/206 |
| 6,370,566 B2 * | 4/2002 | Discolo et al. | ................ | 709/206 |
| 6,424,995 B1 * | 7/2002 | Shuman | ........................ | 709/206 |
| 2003/0093483 A1 * | 5/2003 | Allen et al. | ................... | 709/207 |
| 2004/0133561 A1 * | 7/2004 | Burke | ............... | 707/3 |
| 2004/0139163 A1 * | 7/2004 | Adams et al. | ................. | 709/206 |

FOREIGN PATENT DOCUMENTS

EP          1315106 A1 *    5/2003

OTHER PUBLICATIONS

Gurviciute, K., Supporting Sales management with CRM Software—Case SAP AG, Master Thesis No. 2000:20, Goteborg University, 2001, pp. 1-82.*
Business Software, SAP Gets to the Core of CRM by Dan Muse @ http://www.smallbusiness computing.com/biztools/article.php/3110261, pp. 3-5, Nov. 18, 2003.

(Continued)

*Primary Examiner* — Cheyne Ly
(74) *Attorney, Agent, or Firm* — Kenyon & Kenyon LLP

(57) ABSTRACT

Methods and apparatus are provided for storing email messages into activity records in business management system. In an embodiment, an user interface for an email application program may receive a request may be received to create an activity record in a business management system based on a received email message, and in response an activity record may be created in a database in the business management system.

23 Claims, 10 Drawing Sheets

OTHER PUBLICATIONS

SalesLogix, Outlook Integration, http://www.saleslogix.com/home/index.php3?cellid=302010101011, one page, Jul. 19, 2004.

Microsoft Business Solutions Customer Relationship Management, Business Solutions CRM, http://www.microsoft.com/BusinessSolutions/Microsoft%20Custom . . . , one page, Jul. 19, 2004.

University of Chicago, GSB Training, http://gsbwww.uchicago.edu/computing/training/ . . . , 3 pages, Jul. 19, 2004.

Microsoft Outlook Programming, "Microsoft Outlook COM Add-ins", outlookcode.com, http://www.outlookcode.com/d/comaddins.htm., 4 pages, Aug. 3, 2004.

\* cited by examiner

METHOD AND APPARATUS FOR CREATING AN ACTIVITY RECORD IN A BUSINESS MANAGEMENT SYSTEM FROM AN EMAIL MESSAGE

CROSS-REFERENCE TO RELATED APPLICATION

This application claims the benefit of priority afforded by provisional application Ser. No. 60/588,392 filed Jul. 16, 2004 and provisional application Ser. No. 60/588,391, filed Jul. 16, 2004.

BACKGROUND

The present invention relates to electronic mail and business management systems.

Electronic mail, or "email," is the transmission of private messages such as text entered from a keyboard (and/or an electronic file stored on a disk) over communications networks. Email messages are typically addressed to the private electronic mailbox of an individual recipient or group of recipients. An email system typically stores received messages in the electronic mailbox at least until the recipient fetches the message, at which point the recipient may take one or more actions by entering commands/requests to the email application program's user interface, such as forwarding the message to another email user, replying to the message, deleting the message, saving the message within a folder in the email system, etc. As used herein, an user interface is an interface that handles the input and output of information between the application program and the user of the application program, and may include a display screen as well as instructions that support the input and output of information to the application program. The user interface includes screens that are standard for the application program as well as add-in features, if any, that may be added to the user interface.

Email systems generally comprise a computer system directly or remotely executing a software program that manages email for a user or group of users. An email application program may also perform other tasks, such as managing a calendar, managing an address book, etc. Some examples of email software are Microsoft Outlook®, Lotus Notes®, Eudora, and Yahoo! Mail®. Email systems may use a format to communicate with other email systems, such as the SMTP protocol or some other standard.

As used herein, a business management system ("BMS") is a customer relationship management ("CRM") system, a supplier relationship management ("SRM") system, or an enterprise resource planning ("ERP") system. A CRM is a system that manages business interactions between an organization and a customer, partner, or supplier. For example, a CRM system may allow a company to manage sales or service related interactions with its customers. Examples of CRM software are SAP Business One® and Oracle CRM®. An SRM system is a system that enables businesses to manage their relationships with their suppliers and vendors, and an SRM's functionality typically includes interaction management, bid management, etc. In many respects, these interactions are similar to those in a CRM system. Examples of an SRM system are SAP Business One® and Oracle SRM®. An ERP system is a system that allows an enterprise to share customer, product, competitor and market information. Examples of an ERP management system are SAP Business One®, Great Plains™, MAS200™, and Netsuite™.

Each customer may be represented in a BMS by a record, which may be a data object in that it is associated with actions/functions that may be done to the record. An example of a data object is a business object, such as a customer business object or a quote business object. In BMSs, an "activity" record is understood to mean a data object that records an interaction with a customer, partner, or supplier. As used herein, a "business partner" refer to a customer, vendor or lead.

Among other things, the present inventors perceived a need in the art to facilitate the use of email messages within an organization that uses a BMS.

DETAILED DESCRIPTION

The present invention provides methods and apparatus for creating an activity record in a customer relationship management system from an email message. In embodiments, email messages in a user's mailbox, and which may be accessible only to that user, may also be stored as activities in a BMS. In an embodiment, the email message itself as well as attachments to the email message may be stored as attachments to the activity in the BMS. In a further embodiment, the contents of a large quantity of inbound email messages (e.g., in response to campaigns) may be saved to the BMS in one action.

In an embodiment, an activity that contains an email message may be associated to a business partner record and may reference any relevant sales opportunities, service calls, items, and transactional documents (e.g. invoices, orders, quotations, purchase orders, etc). Such an association may be selected manually by a user or received from a recommendation engine. In an additional embodiment, BMS personal contact records may be created automatically from email messages, and updates to email address fields for records in the BMS may be driven from an outside application.

In an embodiment, the activity is stored as a closed activity and follow-up activities may be created in the BMS, such as for meeting, tasks, etc. Reminders may also be created linked to this activity. It will be appreciated that modifications and variations of the examples described herein are covered by the teachings provided below and are within the purview of the appended claims.

Figure 1:
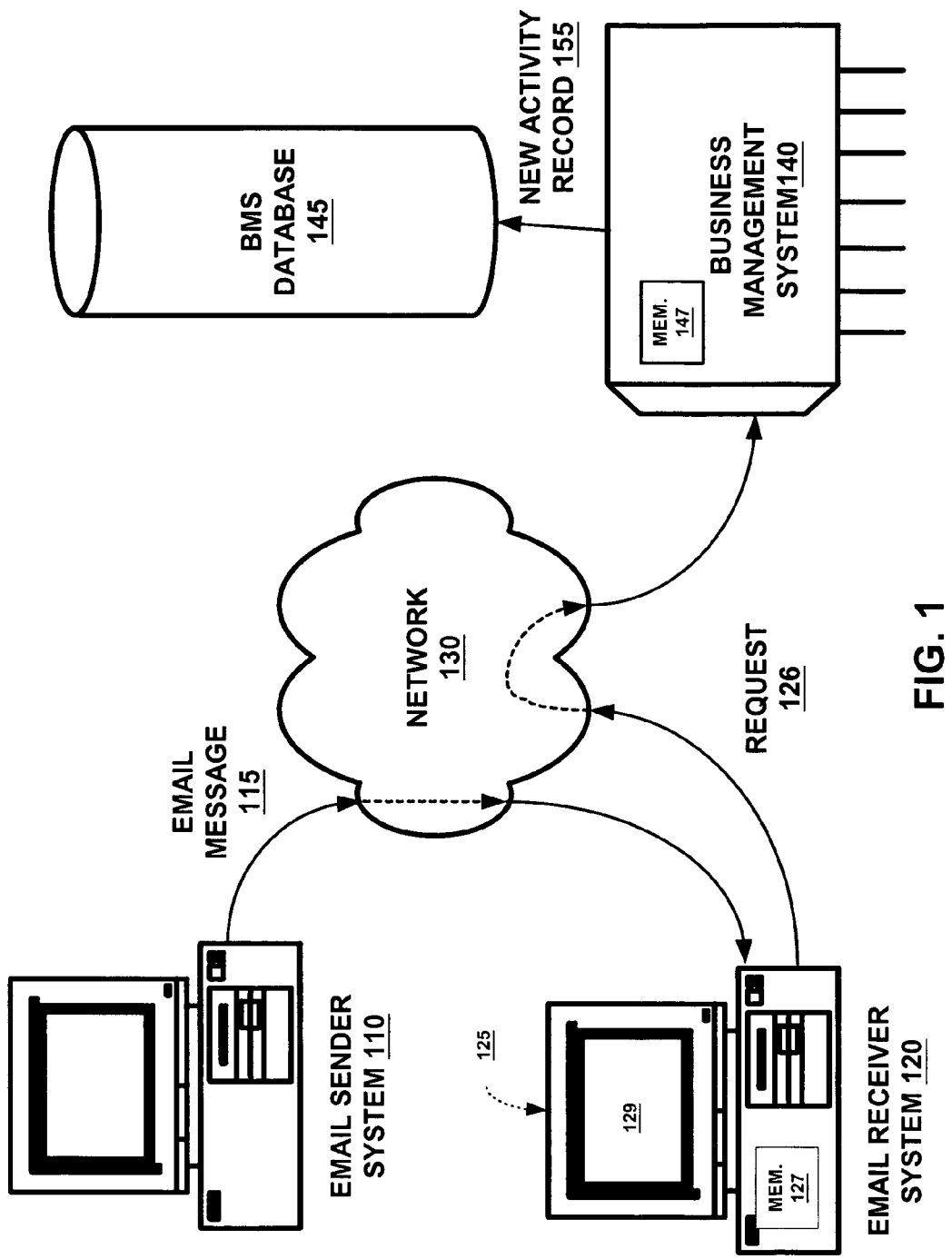
FIG. 1 is a simplified block diagram that illustrates a network in which an email message is received and an activity record is created in a business management system based on the email message according to an embodiment of the present invention.

FIG. 1 is a simplified block diagram that illustrates a network in which an email message is received and an activity record is created in a business management system based on the email message according to an embodiment of the present invention. FIG. 1 shows an email sender system 110, an email receiver system 120, and a BMS 140 that are coupled together over a network 130. Network 130 may be any type of network for communicating information, such as a local area network (LAN), wide area network (WAN), the Internet, or an intranet. Email sender system 110 and email receiver system 120 may be any type of devices for sending email, such as for example a personal computer, a terminal, a personal digital assistant (PDA), etc. Email sender system 110 and email receiver system 120 may be the same or different types of devices. Email receiver system 120 may contain a display 125 to display information and a memory 127 that may store data and software programs. Memory 127 may be, for example, a Random Access Memory (RAM). In the embodiment shown, email receiver system 120 is capable of executing application software. Display 125 is shown in FIG. 1 as displaying a screen 129 for a user interface of an email application program. Memory 127 is a machine readable medium which stores a computer program (which as is well known comprises a plurality of instructions) that is executable by a computer system, such as email receiver system 120. A machine readable medium is any medium cable of being read by a machine, such as a floppy disk memory, CD-ROM, etc.

BMS 140 may be a terminal server, mainframe computer, or any type of computer system that maintains a business management database. As shown, BMS 140 contains a memory 147 (e.g., a RAM) which may store data and application programs. In addition, BMS 140 is shown coupled to a BMS database 145, which may be any type of computer readable medium, such as one or more hard disk memories, that stores instructions and data for a system that maintains a collection of data to support a decision making process. BMS database 145 may contain a plurality of data objects. With regard to the BMS, email receiver system 120 may be referred to as a front-end system and BMS may be referred to as a back-end system. Typically, many front-end systems may be coupled to the back-end system through network 130.

As shown in FIG. 1, email receiver system 120 receives an email message 115 that is sent from email sender system 110 over network 130. As is well known, the email message may not be addressed to a particular receiver system, but rather to a receiver mailbox which typically may be read from many different computer devices (e.g., those on a network), but FIG. 1 refers to a single email receiver system for the sake of simplicity. In response to the email message, email receiver system 120 is shown sending a request 126 to BMS 140 that requests that an activity record by created in the BMS database maintained by BMS 140, and BMS 140 is shown sending a new activity record 155 to be stored in BMS database 145.

Figure 2:
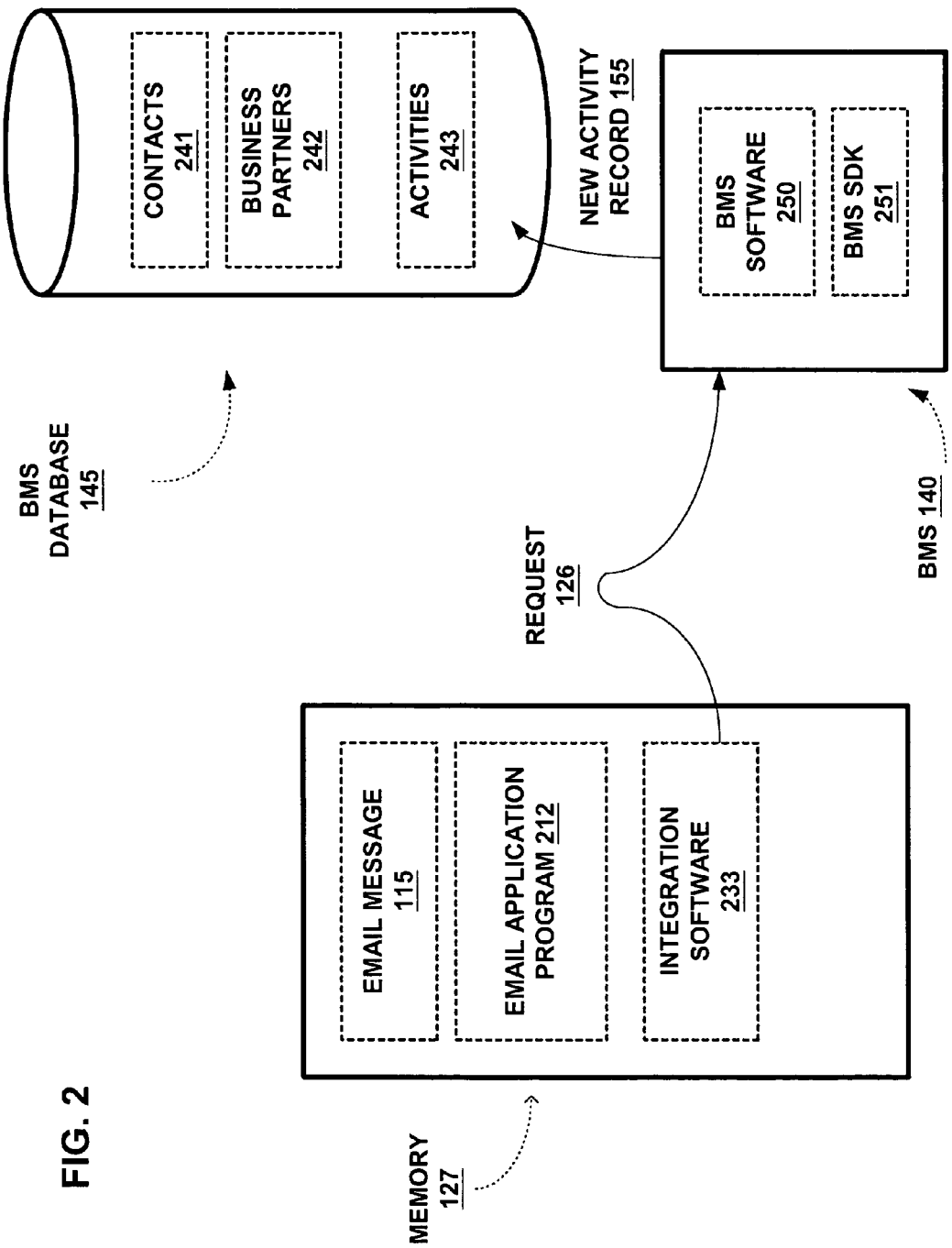
FIG. 2 is a simplified block diagram that illustrates a stored email message, stored business management system records, and related software according to an embodiment of the present invention.

FIG. 2 is a simplified block diagram that illustrates a stored email message, stored business management system records, and related software according to an embodiment of the present invention. In addition to request 126, new activity record 155, BMS 140, and BMS database 145 of FIG. 1, FIG. 2 also shows memory 127 of email receiver system 120. FIG. 2 shows memory 127 storing email message 115 after that email message was received by email receiver system 120. FIG. 2 further shows memory 127 as storing email application program 212 and integration software 233. Email application program 212 may be a software program, such as Microsoft Outlook®, that is executed by email receiver system 120 to manage email for a user of email receiver system 120. Email message 115 would typically be stored in memory 127 in an email format (such as the ".msg" format) in a file that is accessible by an email application program 212. In the embodiment shown, integration software 233 integrates applications at email receiver system 120 with business management system 140. Integration software 233 may be automatically initiated at the start-up of email receiver system 120 and may integrate itself into a user interface of email receiver system 120. Integration software 233 may include instructions or calls to instructions that add-in features to the user interface of the email application program. In an embodiment, integration software 233 includes or is a software add-in to email receiver system 120 that adapts the user interface of the email application program to enable it to integrate with the BMS and to exchange information electronically.

BMS database 145 is shown including records for a plurality of contacts 241, business partners 242, and activities 243. For example, business partners 242 may include records that have data for a business partner of a user of BMS 140 (e.g., a supplier), contacts 241 may include records that have data for a contact of a user of BMS 140 (e.g., a person at that supplier), and activities 243 may include records that have data for an activity of a user of BMS 140 (e.g., a record of a call that was received from that supplier). Of course, BMS database 145 may also store records different than and in addition to those shown.

BMS 140 is shown in FIG. 2 as storing BMS software 250 and BMS software development kit ("SDK") 251, which may be stored in memory 147. BMS software 250 may be a software program that manages BMS database 145. For example, BMS software 250 may add new records, modify records, or perform other activities on records in BMS database 145.

FIG. 2 shows request 126 being sent from integration software 233 of email receiver system 120 to BMS 140. Request 126 may be generated if a user who is executing email application program 212 on email receiver system 120 inputs a request to email receiver system 120 that a BMS activity be created based upon a received email message (such as email message 115). In an embodiment, integration software 233 contains the functionality to cause the reading or writing of data objects in BMS 140 and to cause the creation of activities in BMS 140 based on email messages. In response to request 126, BMS may send new activity record 155 to be stored in BMS database 145 as one of the activities 243. For example, the mail message may be converted to the plain text field in an activity record.

Figure 3:
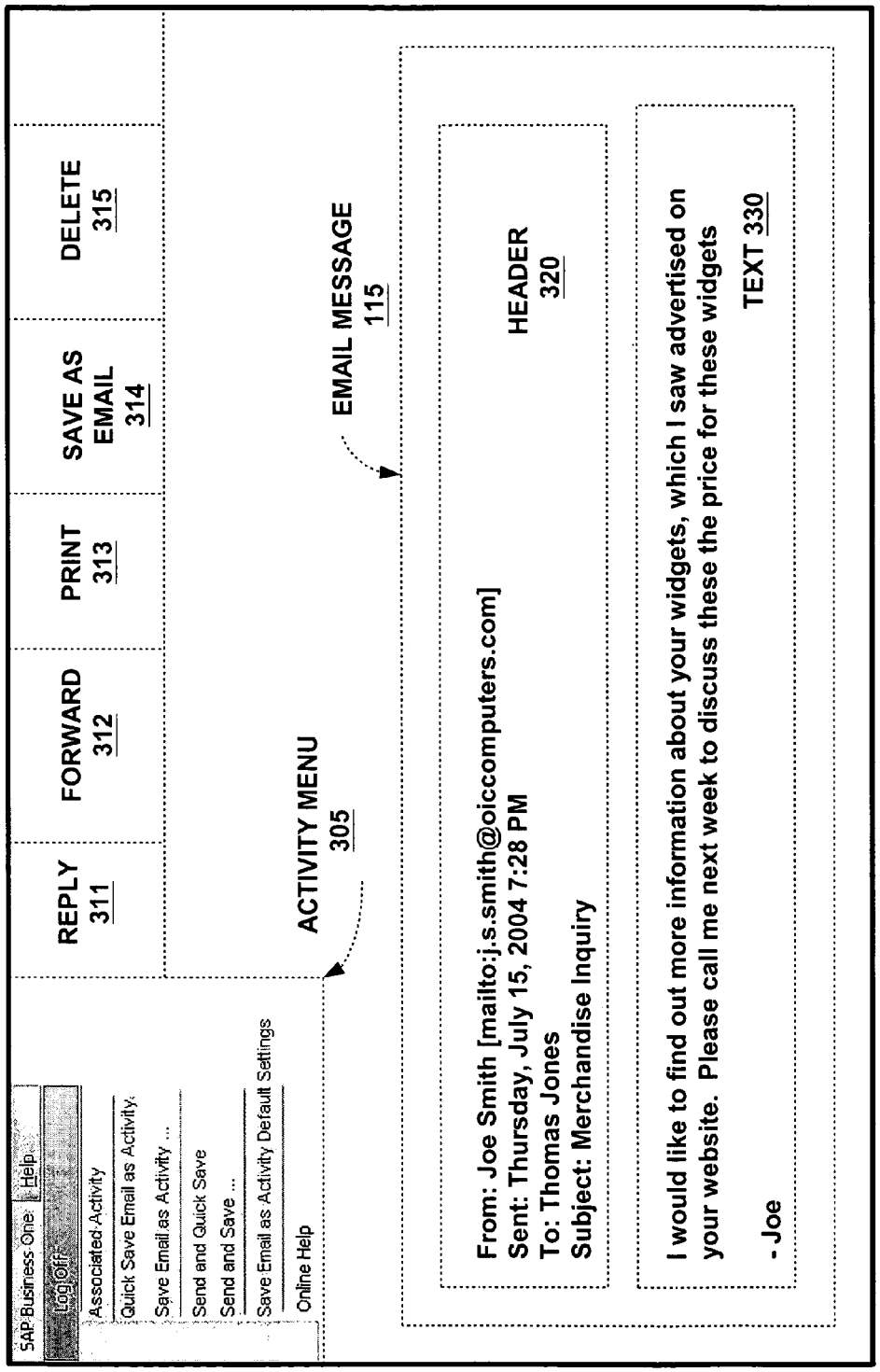
FIG. 3 is a simplified block diagram that illustrates an email message as displayed in a screen of the user interface of an email application program according to an embodiment of the present invention.

FIG. 3 is a simplified block diagram that illustrates an email message as displayed in the screen of the user interface of an email application program according to an embodiment of the present invention. FIG. 3 shows screen 129 of an user interface for an email application executing on email receiver system 120. Screen 129 is displaying the contents of email message 115 as it may be displayed when executing email application program 212 on email receiver system 120. Screen 129 is also shown as displaying an activity menu 305 for interfacing with the BMS 140, a sample of functions that may be performed, and the email message by email application program 212. The particular functions shown are: reply 311, which may allow a user to reply to the email message; forward 312, which may allow a user to forward the email message to another email user; print 313, which may allow the user to print the email message; save as email 314, which may allow the user to save the email message in an email format in a email folder; and delete 315, which may allow the user to delete the email message.

Email message 115 is shown as containing a header 320 and message text 330. In the example shown, header 320 contains: a "From" field that contains the name and email address of the sender of the email message; a "Sent" field that contains the date and time when the email was sent; a "To" field that contains the name of the recipient of the email; and a "Subject" field that contains the subject of the message. In an other example, the email message may have multiple recipients, some of which may be "cc" recipients. In an embodiment, the display as shown in FIG. 3 may be displayed when the email message 115 is opened by the email application program. In an embodiment, activity menu 305 is enabled when an email is selected (but not yet opened) in the inbox in that a user may save the email as an activity without having to open it.

In an embodiment, a user of email receiver system 120 who is executing email application program 212 may select one of the items in activity menu 305 to interface with BMS 140. As shown, activity menu 305 contains the menu items "Associated Activity", "Quick Save Email as Activity," "Save Email as Activity", "Send and Quick Save", "Send and Save", "Save Email as Activity Default Settings", and "Online Help." In an other embodiment, activity menu 120 may contain more, less, and/or different menu items.

Using "Save" Functions to Create an Activity Record

In the embodiment shown, an activity record will be created in BMS 140 if the user selects either the "Save Email as Activity", "Quick Save Email as Activity", "Send and Quick Save", or "Send and Save" menu option. If "Save Email as Activity" is selected, a configuration window is displayed that allows the user to manually determine the appropriate contact person of the activity that will be created and any follow up actions, as discussed below. If the "Quick Save Email as Activity" menu option is selected, the email address of the sender may be matched to an email address of a contact person in the BMS, as also discussed below. Once a match is identified, an activity is created, and this activity may include attachments subject to the default attachment settings. In addition, a follow up action for the activity may be determined from default follow up settings which may be stored in a profile.

The "Send and Save" option may encapsulate the action of sending the email via the email application program mechanism for sending email messages, and in addition perform a "Save Email as Activity" as discussed above. For example, if a user is sending an email to a contact person and also would like this email saved as an activity in the BMS, the user will be able to do so in one step by using the "Send and Save" feature. The "Send And Quick Save" option may encapsulate the action of sending the email via the email application program's mechanism for sending messages and perform a Quick Save Email as Activity as discussed above. In an embodiment, the "Send and Save" option and "Send And Quick Save" option are only visible when a new mail message is being composed or a message is being replied to or forwarded. In an embodiment, there may be an option to integrate a quick save and a configurable save into the action of sending an email to a contact person.

Once an email has been saved, the user may get a confirmation window indicating that the email was successfully saved as an activity, which should list the details of the associated activity. Such a window might provide information such as activity number and type, business partner code and name, contact person, follow up activity, a due date of the follow up, and a reminder.

Figure 4:
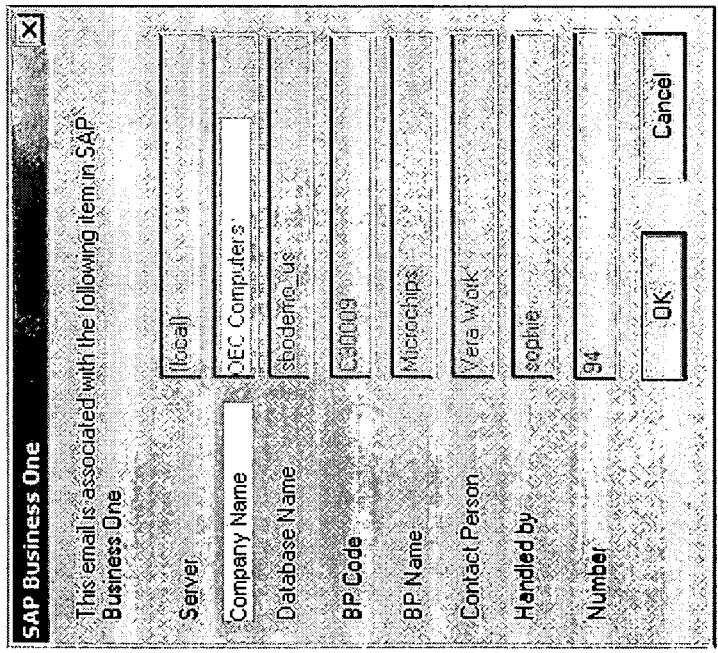
FIG. 4 is a screen shot of a window showing information stored in the email message associated to an activity record according to an embodiment of the present invention.

In the embodiment shown in FIG. 3, once an email has been saved as an activity, choosing the "Associated Activity" menu item will cause a window to be displayed on as part of screen 129 that shows information stored in the activity record associated to this email message. A screen shot with an example of such a window 401 according to an embodiment of the present invention is shown in FIG. 4. In one embodiment, this menu option is disabled if the email has not yet been saved. In the alternative, this window may appear with all blanks in this case. As shown in FIG. 4, the information for the activity which is associated with the email may include the server, company name, database name, business partner code, business partner name, contact person, name of the person on the BMS handling the activity, and the activity record number.

Default Settings

Figure 5:
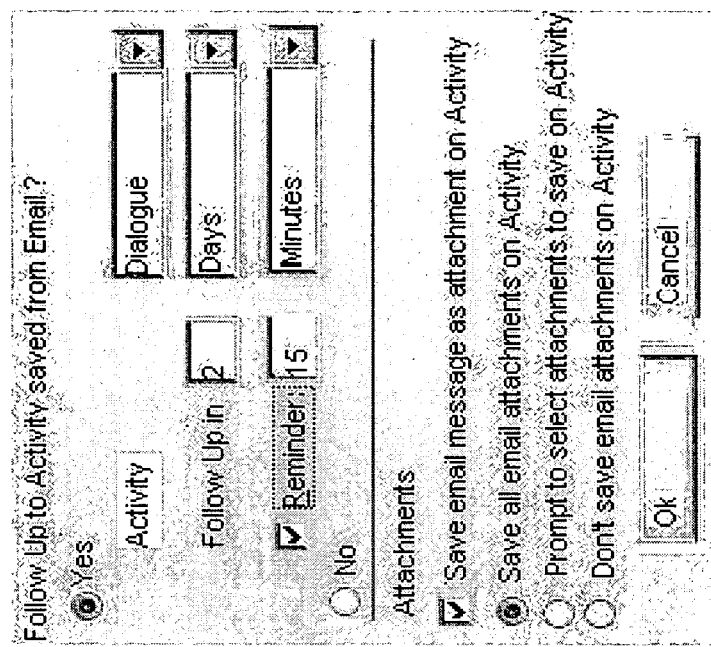
FIG. 5 is a screen shot of a window for defining default behavior for creating an activity from an email according to an embodiment of the present invention.

The "Save Email as Activity Default Settings" option may invoke a window to define the default behavior for saving Email as Activities. A screen shot with an example of such a window 501 according to an embodiment of the present invention is shown in FIG. 5. The settings may pertain to areas, follow up activity and attachment handling. As shown in FIG. 5, a user may select default follow-up activities or default for including attachments to the activity. As to follow up activity settings, in this embodiment the user can pick the "Yes" radio button if there will be a follow up and "No" otherwise. In an embodiment, the follow up activity may be identical to that of the activity created from the saved email with the following possible exceptions:

The Date and Time in the header may differ by the time it takes to save the first activity and to create the follow up activity.

The user may pick the activity type, as the follow up activity may be, for example, a meeting, a dialogue, or a task. In an embodiment, the default for the settings is "Dialogue".

Activity date and time in the activity created from the email may be the date of the email, while the activity date and time for the follow up activity maybe the current date plus the duration specified in the settings window. The use of predefined codes for the various units of time is preferable. The default value for the follow up timeframe may be 2 days, and the default duration may be 15 minutes.

Content for the follow up activity may be the same as that for the original activity other than a row of "_____" with a carriage return will be added to the first row.

When the user is using the "Save Email as Activity" function, which manually defines the parameters for the associated activity, then the fields shown in the above settings window may be shown in an Association Definition window and the default values for this window may be those from the default settings window.

As to the attachment settings option, the user may decide whether or not they would like the original email saved as an attachment to the activity. In an embodiment, if this checkbox is selected (by default, it is not), then the email will be saved as an attachment of type ".msg" which is a recognizable email message format that will keep all message formatting, attached files, etc. In addition, as pertains to attachments within the email, the user may be able to decide between options that are independent of whether the original email is saved as an attachment on the activity. One option may be to save all attachments, in which case all attachments on the email will be saved as attachments on the created activity. Another option may be to prompt to select which attachments to save, which may show the user a list of attachments and allow the user to pick which attachments should be saved on the created activity. In the case of either "Quick Save Email As Activity" or "Save Email as Activity", the user may be prompted concerning attachments once all other screens have been shown, after the primary email address for the activity and in the case of the "Save Email As Activity", after the window with the Save Email options has been shown. Another option is not to save any attachments.

Choosing a Contact or Business Partner

An embodiment includes a business partner filter that may allow the user to fine tune the list of business partner data objects from the BMS that may be presented to the user when creating an activity. Optional filters may be showing all business partners (this may be the default), showing only those business partners that are owned by this user, showing only those business partners with codes in a specified range, showing only those business partners in a list of specified groups, or showing only those business partners that are owned by selected sales employee(s). Certain of these options may also be presented in the same fashion as they are when they are shown when synchronizing settings for contacts. The option setting that is choose may be saved. Whenever the list of business partners is shown, the email receiving system may check these settings and if necessary add the appropriate filter to manage the list of business partners.

In an embodiment, a user may pick a business partner or contact person to be associated with the email message using lookup lists. Once contact person is selected, the email receiver system may offer to add/modify email address for selected contacts. In an embodiment, if the user does not pick business partner and contact person, a recommendation engine may be used to make recommendations by finding other contacts with same domain (text after the "@") in their email address. In an embodiment, the system may do this automatically.

Figure 7:
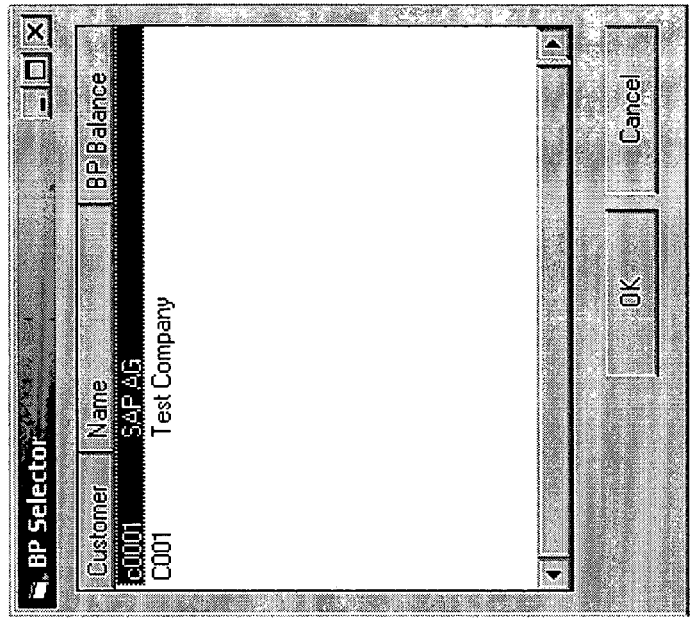
FIG. 7 is a screen shot of a window that may be used to select a business partner according to an embodiment of the present invention.
Figure 6:
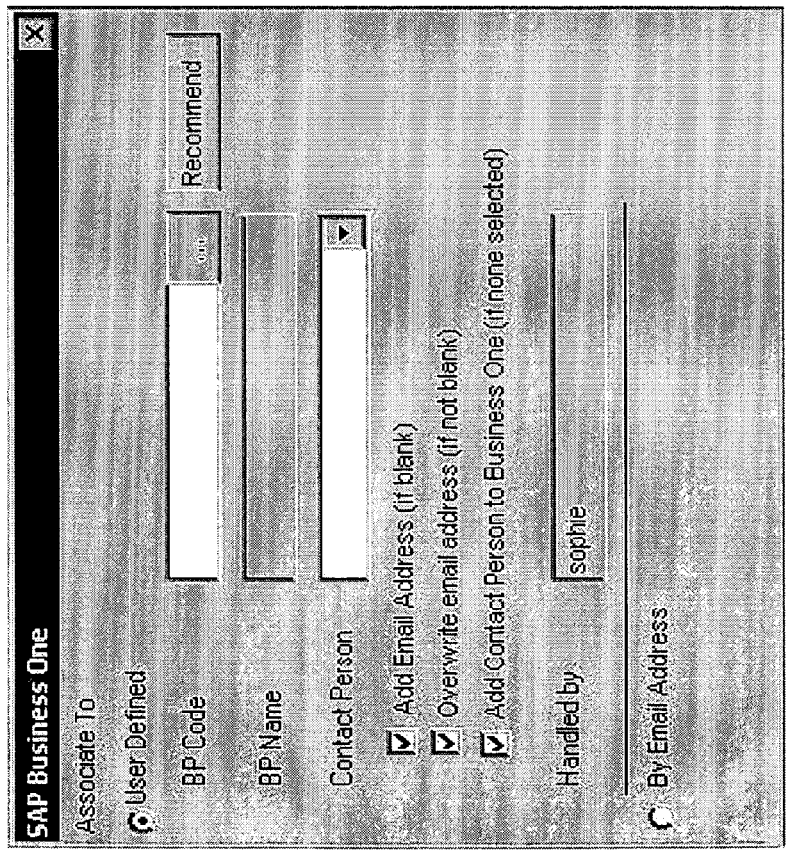
FIG. 6 is a screen shot of a window for defining whether the association between an email message and a business partner is manual or automatic according to an embodiment of the present invention.

In an embodiment, the only method of saving an email to an activity may be an automated one that relies upon a match between the email address of the sender and a contact in the BMS. In the event that no match could be found, the user may be able to update the BMS. Given that people use multiple email addresses, another embodiment allows a user to define manually the association for an email. To this end, a window may allow a user to define the contact person to which this email will be associated, override the default follow up actions (if any), and/or override the default attachment settings. In an embodiment, such a window is invoked by selecting "Save Email as Activity . . ." or "Send and Save . . ." from the activity menu 305. The user may be able to define whether the association will be manual or automatic. A screen shot with an example of such a window 601 according to an embodiment of the present invention is shown in FIG. 6. If automatic, it may be the same as a "Quick Save", discussed above. If the user selects "User Defined", then the user selects the association. The user may pick a business partner by pressing the button with the ellipsis " . . . ", which will bring up a window for selecting a business partner. A screen shot with an example of such a window 701 according to an embodiment of the present invention is shown in FIG. 7. In an embodiment, this window will by default bring up all business partners. In a further embodiment, the user may be presented with the option to fine tune the list of business partners that they will see in the list. Once the user selects the business partner, the business partner code and name fields may be copied to the previous window.

The contact person drop down list shown in FIG. 6 may be populated with the contact people related to the selected business partner. The selected contact person may be the default contact for the business partner. The "Recommend" button shown in FIG. 6 may provide assistance to the user to suggest the appropriate contact person as a business partner based upon characteristics of the email address. The recommend function may evaluate the domain portion (part of email address after the "@" symbol) of the email address and then proceed to identify other contact persons in the BMS with email addresses with the same domain. The matches may be presented in a window to allow the user to pick a contact person based upon this match. A screen shot with an example of such a window 801 according to an embodiment of the present invention is shown in FIG. 8.

Figure 8:
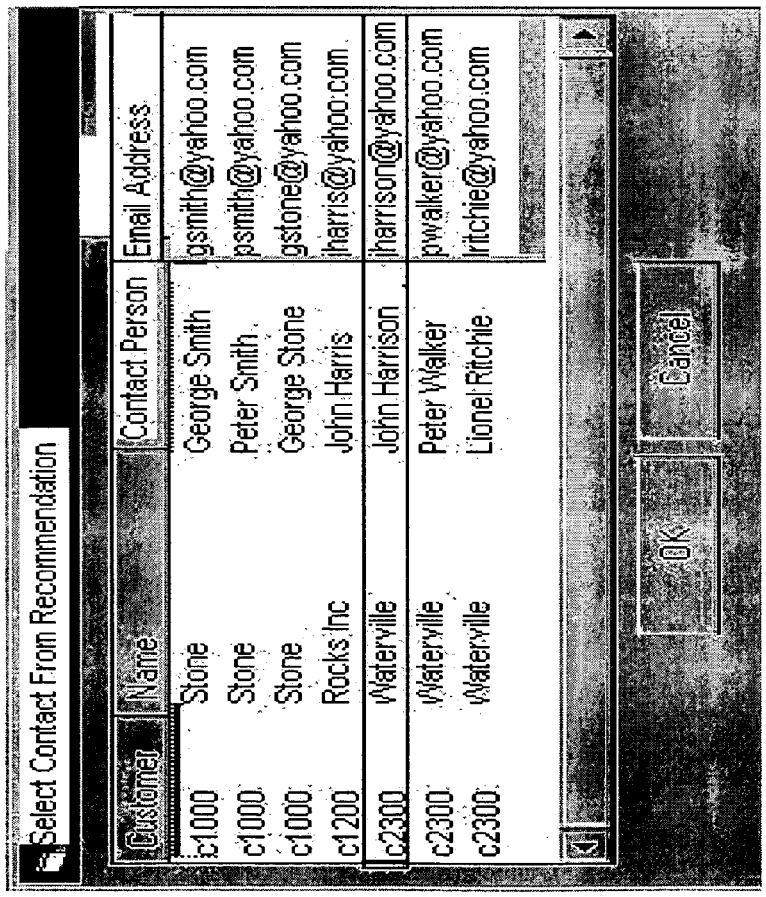
FIG. 8 is a screen shot of a window that may be used to pick a contact person based upon characteristics of the email address according to an embodiment of the present invention.

In an embodiment, the user will be able to select one of the records listed in FIG. 8 and this selection will be copied to an "Associate To" tab, with the contact person defaulting to the chosen contact from this screen. There may of course be business partners with the same domain in the email address, and those could also appear in this window. If a Business partner is chosen, then the contact person drop down may default to the default contact for the business partner.

In an embodiment, a user may not be required to select a contact person, in which case the email message may be associated to the business partner and not to a specific contact person. Check boxes in FIG. 6 may provide additional functionality over and above the saving of the email. For example, the first check box shown, "Add Email Address (if blank)", may allow the user to have the system automatically update the contact or business partner email address with the one from the email only if the existing email address is blank. The second check box shown, "Overwrite Email Address (if not blank)", may allow the user to have the system automatically override the existing email address on the selected business partner or contact person. The third checkbox shown, "Add Contact Person to Business One (if none selected)", may allow the user to have the BMS automatically create a contact person associated to this business partner and to associate the activity to this new contact person. In this scenario, the BMS may create the contact person first and then create the activity related to this email. In terms of creating the contact person, the fields in this record may contain the display name included in the email address and the email address from email message. The contact person may be added to the BMS and may be saved as a contact in an application program at the email receiver system based upon a corresponding record in the BMS. If all three checkboxes are checked, the result may be that both the newly created contact person and the business partner may have the email address from the email, if no contact persons were previously defined for this business partner. If the user s,elects the "By Email Address" option shown in FIG. 6, then the association may be automatic, which may duplicate much of the behavior of the "Quick Save Email as Activity" option.

Follow Up Activities and Attachments

Figure 9:
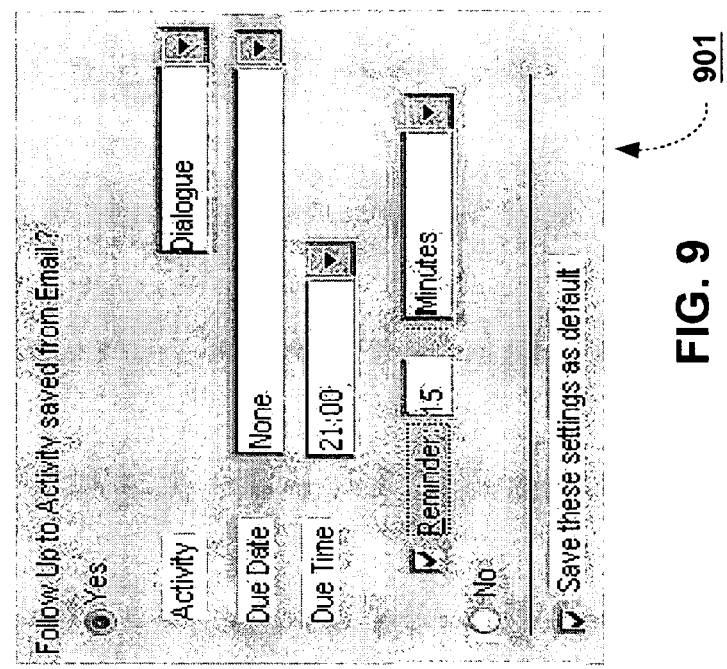
FIG. 9 is a screen shot of a window that may be used to override the default follow up settings for a given email message according to an embodiment of the present invention.

In an embodiment, a user may be able to override the default follow up settings for a given email message. A screen shot with an example of such a window 901 according to an embodiment of the present invention is shown in FIG. 9. The Due Date and Time shown are the date and time of the follow up. The date may default to today plus the "Follow Up In . . . " number of days defined in the Save Email Settings, as discussed above. The reminder checkbox and timeframes and activity type may default to the value according to the aforementioned settings, but the user may have the ability to override the default settings for this email. The Follow Up on Date may have a calendar control to allow the user to pick the date. The check box labeled "Save these settings as default" may allow the user to update the default settings from this screen without having to return to the settings screen.

An attachments tab may allow the user to define specifically for the email in question whether the email should be saved as an attachment, and how to save any file attachments on the email, if at all. The fields for this tab may behave as discussed above regarding attachments.

System Behavior

When a user selects the "Save Email" option, a check may be made of an "Associate To" parameter to determine if the email will be saved using user defined parameters or automatically by email address (similar to "Quick Save"). If the user selected By Email Address, then the email may be saved as an Activity in the same way as with Quick Save. In an embodiment, if no matching email address is found for the email address, then no activity is be created and the user may see the message "No matching email addresses were found for <XYZ>", where <XYZ> is the email address from the email (either sender or one of the recipients on the To address line).

If the user selected "User Defined", then the activity may be created for the selected contact person or business partner. If no contact person was selected, this field may be left blank on the activity. The selected contact person, or in absence of one, the selected business partner, may be known as the "Associated Party".

A check may also be made in an embodiment of the attachment settings. If the email is to be saved as a message attachment, then this attachment will be added to the activity. If all attachments are to be saved on the activity, then all attachments will be added to the activity. If the setting for prompt to save attachments is selected, then the user will be presented with a list of attachments. If the user picks any of the attachments, then those attachments will be added to the activity. If the user selects "cancel" then the system will proceed without handling any of the file attachments.

If the Associated Party has a blank email address and the check box labeled "Add the email address (if blank)", then the email field of the Associated Party may be updated with the email address from the email. If the Associated Party has a non-blank email address and the check box labeled "Overwrite email address (if not blank)", then the email field of the Associated Party may be updated with the email address from the email. If the "Add Contact Person" checkbox is checked, then the new contact person may be added.

As to follow up activities, if the "Yes" Follow Up radio button is selected, then a follow up activity may be created for the activity created from the email ("Original Activity"). The Activity Date and Time may be the date and Time defined on the Follow Up tab. The reminder for the Follow Up Activity may be taken from the Follow Up tab if the "Reminder" check box is checked.

Defining Follow Up Activities

The user may be able to define the follow up behavior for the Activity that is created from the email. In an embodiment, the Activity created from email may be saved with a status of closed contact. Should the user wish to follow up on this email, the user may select the follow up option. There may be a window to define the default settings for follow up of the created Activity. These settings may be used whenever the user selects "Quick Save Email as Activity", and may be the default values whenever the user selects "Save Email as Activity . . . ".

Saving Email Attachments to an Activity

Figure 10:
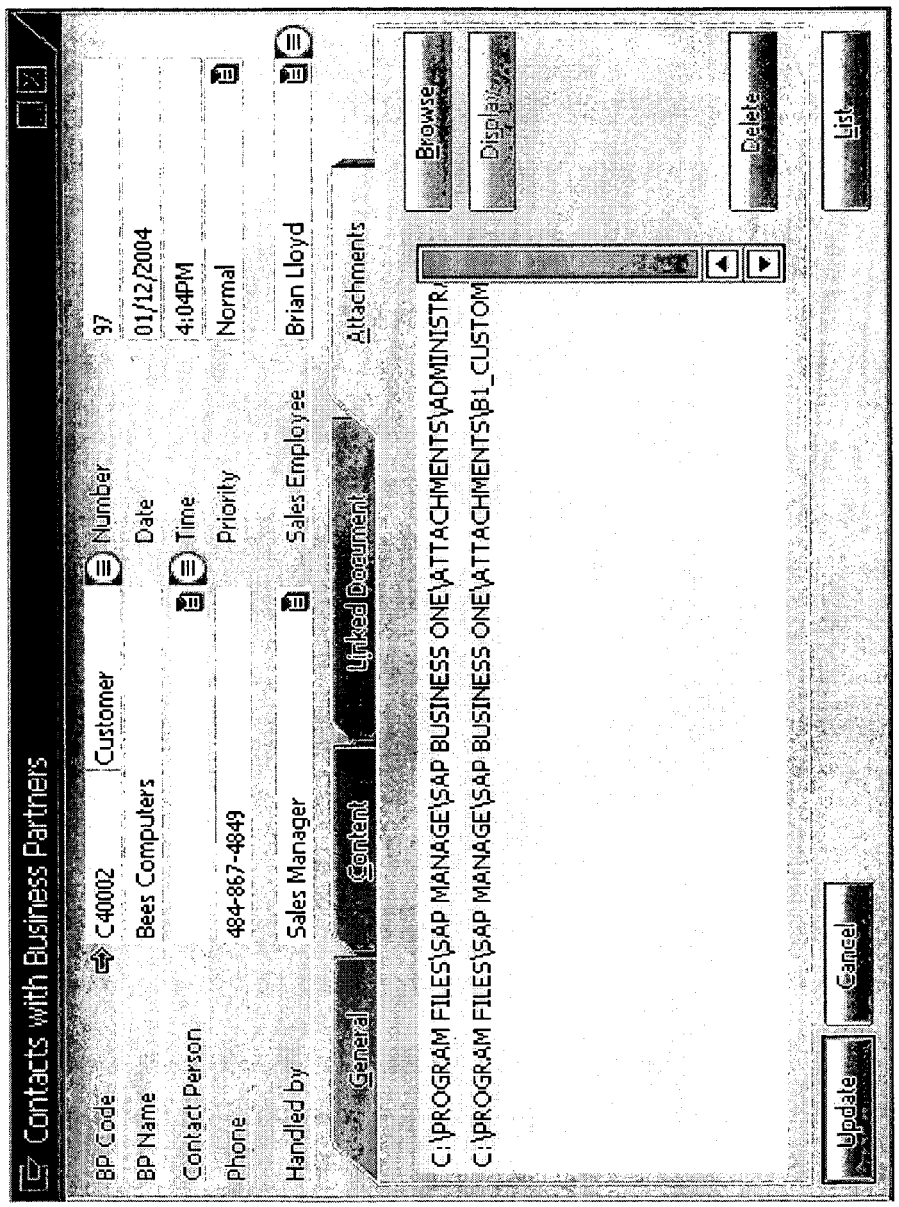
FIG. 10 is a screen shot of a window that may be used to access attachments from an activity screen according to an embodiment of the present invention.

If the email that is to be saved as an activity has any file attachments, these may be saved to the BMS linked to the created activity. In an embodiment, the attachments may be stored on a server file system in the default location for attachments. The user may be able to access these attachments from an activity screen on the attachments tab. A screen shot with an example of such a window 1001 according to an embodiment of the present invention is shown in FIG. 10.

Saving the Original Email as an Attachment

As noted above, there are special file formats that may be recognized by an email application program, such as the ".msg" format that is recognized by Microsoft Outlook®. The email message may be saved in this format at the BMS with the activity record. Such a mechanism may provide a method for capturing the original email and any formatting that could get lost when the message gets converted to the plain text field in an activity record. By selecting the activity in the BMS, a user may be able to show the original associated email message.

Adding Activities for Contract Persons on the To Address Line

If an email message is sent to the contact person from email application program and the user then wishes to save this email message as an activity, in an embodiment a user may be allowed to define the association. When the user selects either "Quick Save Email as Activity" or "Save Email as Activity . . . " from the menu, the system will inspect the email message and present all email addresses from the "To" line, "cc" Line and the Sender. If there are multiple addresses, the user may be presented with a screen to pick the email address of the primary contact. The email addresses in the "From", "to", "cc" fields in the email message may be examined to determine the potential contact email addresses that will be either manually or automatically matched to a contact person in the BMS. The system may exclude the email address of the user from the default profile. If there is more than one email address remaining, then the user may be asked to select the email address that will be associated to the primary contact for the activity that will be created.

In an embodiment, additional activities may be created for the same email for other recipients. In an embodiment, if the BMS supports activity participants, when a user is creating an activity record from an email message, they may be able to select the participants from the list of email addresses in the email message so that they may be added as participants on the activity that will be created.

Figure 11:
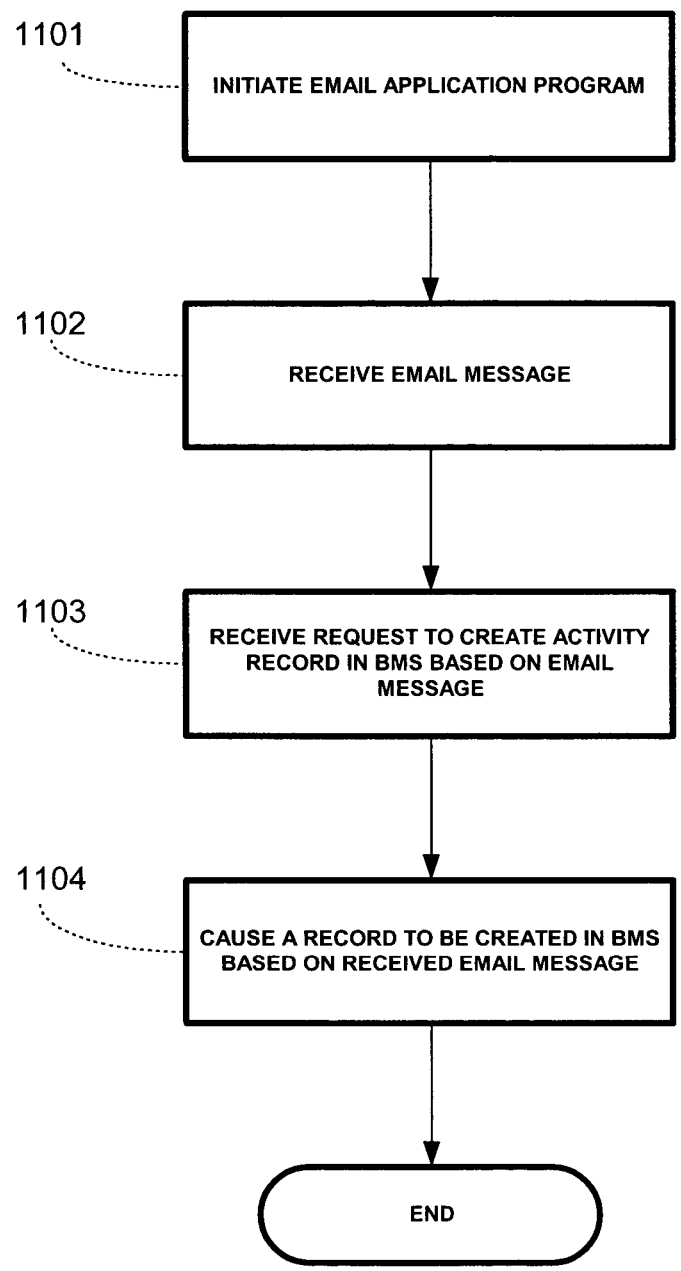
FIG. 11 is a simplified flow diagram that illustrates a method of creating an activity record in a business management system from an email message.

FIG. 11 is a simplified flow diagram that illustrates a method of creating an activity record in a business management system from an email message. This method may be performed, for example, by email receiver system 120. An email application program, such as email application program 212, may be initiated (1101). The email receiver system may receive an email message to be read by a recipient's email application program (1102), such as email message 115. The user interface of the email application program, as shown in FIG. 3, may then receive a request to create an activity record in a business management system based on the received email message (1103). For example, this request may take the form of a request to "save" an email message as an activity (without specifically stating that the activity is a BMS record). In response, the email receiver system may cause an activity record to be created in a database in the business management system based on the received email message (1104). The request to create the activity record may be processed using software instructions at a first computer (e.g., integration software 233) that integrate applications at the first computer with a business management system at a second computer (e.g., BMS 140), and a request may be sent to the second computer to create an activity record in a database in the business management system at the second computer. The request sent to the second computer may include a request that the activity created have certain associations (e.g., with an email address, contact, business partner, etc.).

In an embodiment, the business management system database includes records for a plurality of contact persons, and creating an activity record comprises matching the address of the sender (e.g., "j.s.smith@oiccomputers.com" in the example shown in FIG. 3) with an address in a contact record in the business management database and associating the activity record created with the contact record that matched the address of the sender. In a further embodiment, the email addresses of the sender and one or more recipients may be displayed as a list (e.g., on a first computer), a selection from the displayed list may be received from the user, and the activity record created may be associated with the selected email address (e.g., by sending a request to the second computer). The email message may be stored in an email format as an attachment to the activity record, and/or an email attachment may be stored as an attachment to the activity record.

In embodiments, a list of business partners and/or contacts may be displayed, a selection from that list may be received, and the activity record that is created may be associated in the database with the selected business partner or contact. In a further embodiment, the business partners or contacts listed may be those business partners or contacts that have records in the database indicating an email address with the same domain name as the email address of the sender of the message.

In an embodiment, a list is displayed at the email receiver system of names of persons identified in the business management system database that have an email address with the same domain name as the email address of the sender, a selection of a person from the displayed list is received from the user of the email receiver system, and the created activity record may be associated with the selected person.

In an embodiment, after creating the activity record based on the email message, a follow-up activity record may be created in the business management database that is based on the received email message. A new contact record may also be created in the business management database that is based on the received email message. In addition, a new contact name may be added to an existing business partner record in the business management database based on the received email message.

Figure 12:
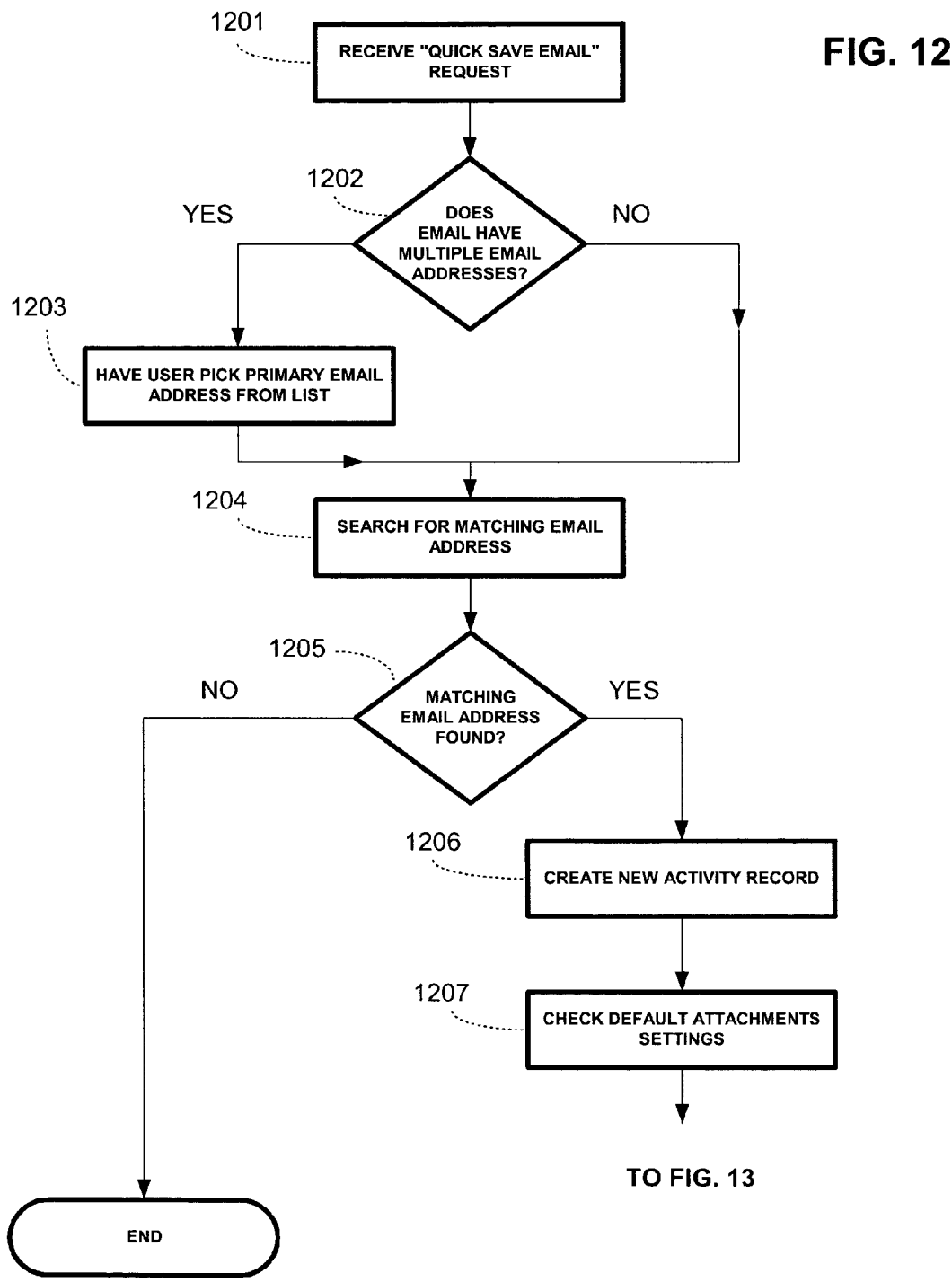
FIGS. 12 and 13 are flow charts that illustrate a method of processing a request to "Quick Save Email" as an activity according to an embodiment of the present invention.
Figure 13:
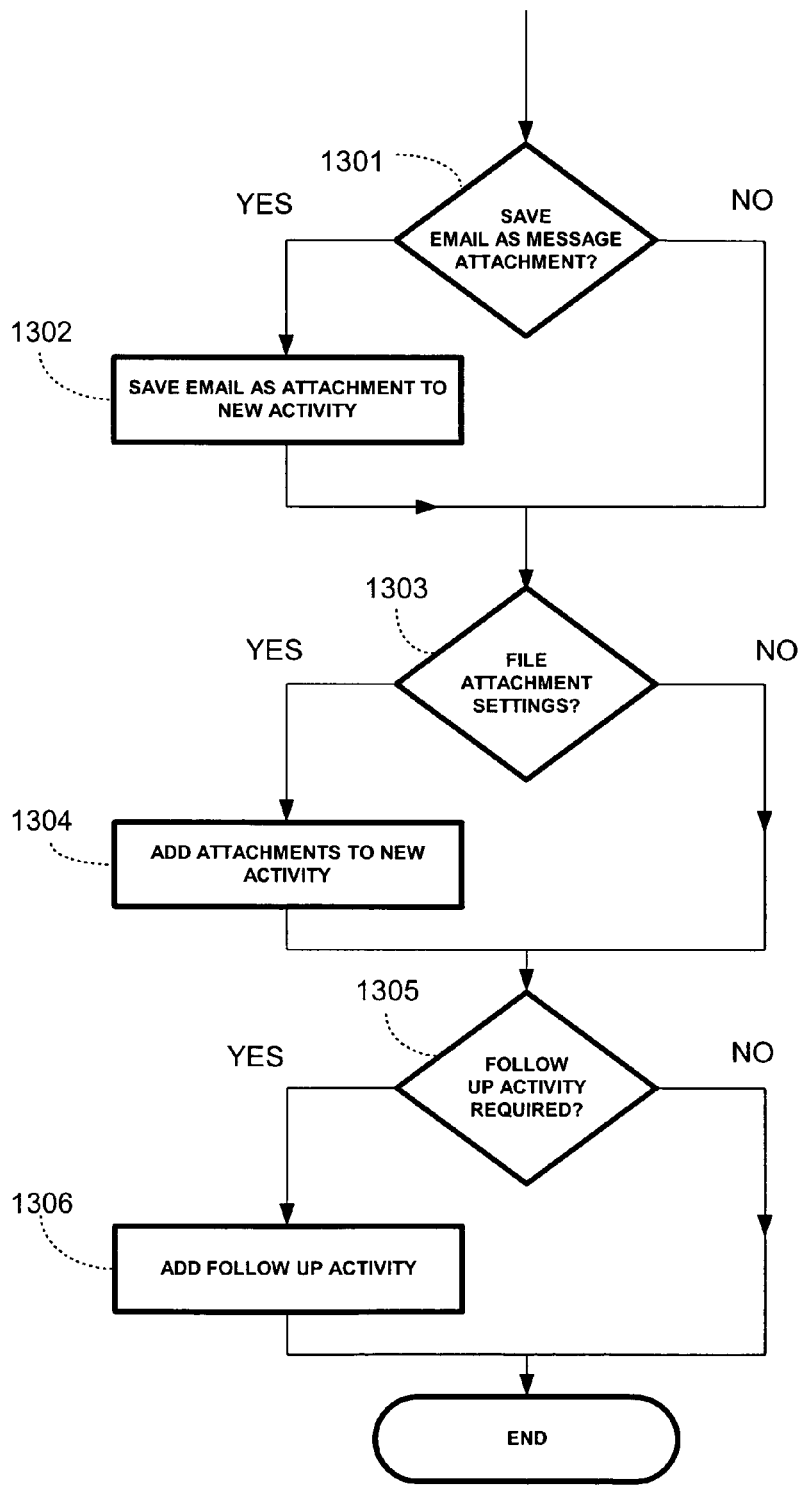

FIGS. 12 and 13 are flow charts that illustrate a method of processing a request to "Quick Save Email" as an activity according to an embodiment of the present invention. After a request to quick save an email as an activity is received from the user (1201), a check is made to determine if the email has multiple addresses (1202). If so, the user may be prompted to pick a primary email address from a list (1203). A search of contact persons and business partners in the BMS is undertaken for a email address matching the primary email address (1204). If a matching email address is not found, the process terminates. If a matching email address is found, a new activity record is created (1206) and a check is made for default settings, such as for attachments and follow up settings (1207). If the email message is to be saved as an attachment (1301), the email message is saved as an attachment to the new activity record, such as in the ".msg" file format (1302). A check may then be made to see if any of the email attachments should be included (1303) and, if so, attachments to the email may be added as attachments to the new activity (1304). The user may be prompted to determine if all attachments or only selected attachments should be saved. A check may then be made to see if a follow up activity is required (1305) and, if so, a follow up activity may be created (1306).

The above is a detailed discussion of certain embodiments. It may be understood that the examples discussed are for illustration purposes only and are not intended to limit the configuration to that shown. For example, buttons or other mechanisms may be used instead of menus to provide access to functions. As another example, the order of the steps performed may be varied as appropriate. It is of course intended that the scope of the claims may cover other embodiments than those described above and their equivalents.

What is claimed is:

1. A method comprising:
responsive to a request entered at an email application program while managing a private email account, exporting from the email application program content of an email message identified by the request to a business management system, wherein the business management system manages activity records for a plurality of business partner accounts;
creating a first activity record in the business management system storing content of the identified email message therein;
displaying email addresses of a sender and one or more recipients of the email message as a list;
receiving a selection from the displayed list of email addresses;
identifying a business partner account from the selected email address;
storing the first activity record in a database of the business management system identified as pertaining to the identified business partner account;
creating a second activity record identified as a follow up activity of the first activity record; and
storing the second activity record in the database of the business management system.

2. The method of claim 1, wherein the business management system database includes records for a plurality of contact persons associated with the business partner account, and wherein creating a first activity record comprises:
matching the address of the sender with an address in a contact record in the business management system database; and
associating the first activity record with the contact record that matched the address of the sender.

3. The method of claim 1, wherein the method further comprises displaying a list of business partners and receiving a selection from that list, and wherein the first activity record is associated in the database with the selected business partner.

4. The method of claim 3, wherein the business partners listed are those business partners that have records in the business management system database indicating an email address with the same domain name as the selected email address.

5. The method of claim 1, wherein the method further comprises displaying a list of contacts and receiving a selection from that list, and wherein the first activity record is associated in the business management system database with the selected contact.

6. The method of claim 5, wherein the contacts listed are those contacts that have records in the business management system database indicating an email address with the same domain name as the selected email address.

7. The method of claim 1, wherein the method further comprises:
displaying a list of names of persons identified in the business management system database that have an email address with the same domain name as the selected email address;
receiving a selection of a person from the displayed list; and
associating the first activity record with the selected person.

8. The method of claim 1, wherein the email message is stored in an email format as an attachment to the first activity record.

9. The method of claim 1, wherein the email message includes an attachment, and wherein the email attachment is stored as an attachment to the first activity record.

10. The method of claim 1, wherein the method further comprises creating a new contact record in the business management system database that is based on the email message.

11. The method of claim 1, wherein the method further comprises adding a new contact name to an existing business partner record in the business management system database based on the email message.

12. A non-transitory machine readable medium having embodied thereon a computer program, said computer program being executable by a computer system to perform a method comprising:
responsive to a request entered at an email application program while managing a private email account, exporting from the email application program content of an email message identified by the request to a business management system, wherein the business management system manages activity records for a plurality of business partner accounts;
creating a first activity record in the business management system storing content of the identified email message therein;
displaying email addresses of a sender and one or more recipients of the email message as a list;
receiving a selection from the displayed list of email addresses;
identifying a business partner account from the selected email address;
storing the first activity record in a database of the business management system identified as pertaining to the identified business partner account;
creating a second activity record identified as a follow up activity of the first activity record; and
storing the second activity record in the database of the business management system.

13. The machine readable medium of claim 12, wherein the business management system database includes records for a plurality of contact persons associated with the business partner account, and wherein creating a first activity record comprises:
matching the address of the sender with an address in a contact record in the business management system database; and
associating the first activity record with the contact record that matched the address of the sender.

14. The machine readable medium of claim 12, wherein the method further comprises displaying a list of business partners and receiving a selection from that list, and wherein the first activity record is associated in the database with the selected business partner.

15. The machine readable medium of claim 14, wherein the business partners listed are those business partners that have records in the business management system database indicating an email address with the same domain name as the selected email address.

16. The machine readable medium of claim 12, wherein the method further comprises displaying a list of contacts and receiving a selection from that list, and wherein the first activity record is associated in the business management system database with the selected contact.

17. The machine readable medium of claim 16, wherein the contacts listed are those contacts that have records in the business management system database indicating an email address with the same domain name as the selected email address.

18. The machine readable medium of claim 12, wherein the method further comprises:
displaying a list of names of persons identified in the business management system database that have an email address with the same domain name as the selected email address;
receiving a selection of a person from the displayed list; and
associating the first activity record with the selected person.

19. The machine readable medium of claim 12, wherein the email message is stored in an email format as an attachment to the first activity record.

20. The machine readable medium of claim 12, wherein the email message includes an attachment, and wherein the email attachment is stored as an attachment to the first activity record.

21. The machine readable medium of claim 12, wherein the method further comprises creating a new contact record in the business management system database that is based on the email message.

22. The machine readable medium of claim 12, wherein the method further comprises adding a new contact name to an existing business partner record in the business management system database based on the email message.

23. An enterprise computer system, comprising:
a processor;
an email system providing email services for a plurality of enterprise system members via private member accounts;
a business management system, managing activity records for business partner accounts of the enterprise system; and
software, executing on the computer system, to export content of an email received at a private member account to the business management system according to a process that comprises:
identifying, from address information in the received email, a business partner account to which the received email pertains;

storing a first new activity record in the business management system that contains content of the received email; and storing a second new activity record in the business management system identified as a follow up activity for the first new activity record.

\* \* \* \* \*